Aug. 1, 1950 J. D. FILARSKI 2,517,473
CATCH-COUPLING FOR COUPLING AN AXLE TO
A WHEEL ROTATABLE ROUND THAT AXLE
Filed Aug. 23, 1946 5 Sheets-Sheet 3

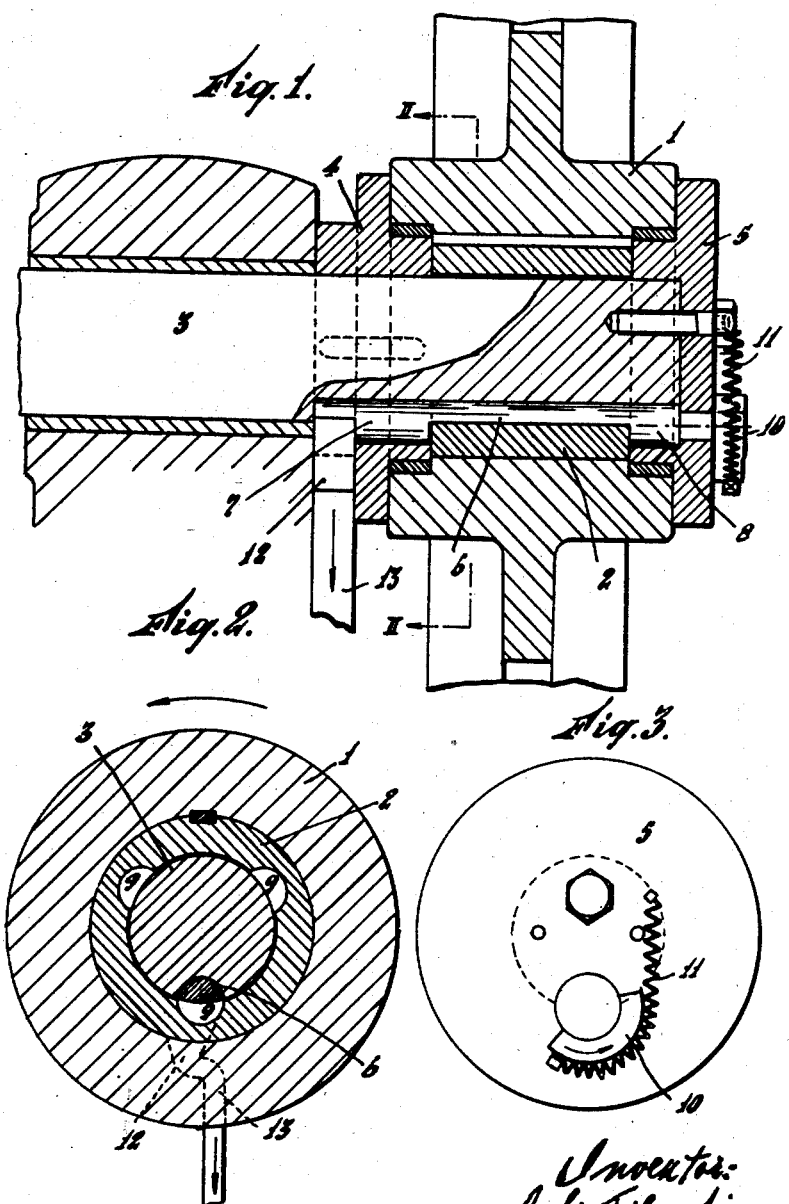

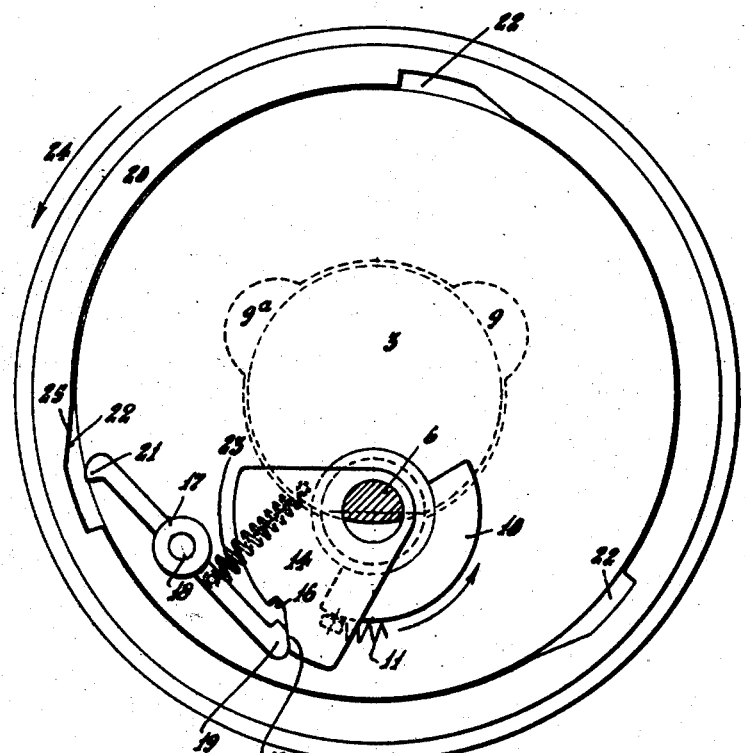

Inventor:
J. D. Filarski

Aug. 1, 1950

J. D. FILARSKI 2,517,473

CATCH-COUPLING FOR COUPLING AN AXLE TO
A WHEEL ROTATABLE ROUND THAT AXLE

Filed Aug. 23, 1946

Inventor:
J. D. Filarski

Aug. 1, 1950     J. D. FILARSKI     2,517,473
CATCH-COUPLING FOR COUPLING AN AXLE TO
A WHEEL ROTATABLE ROUND THAT AXLE
Filed Aug. 23, 1946     5 Sheets-Sheet 5
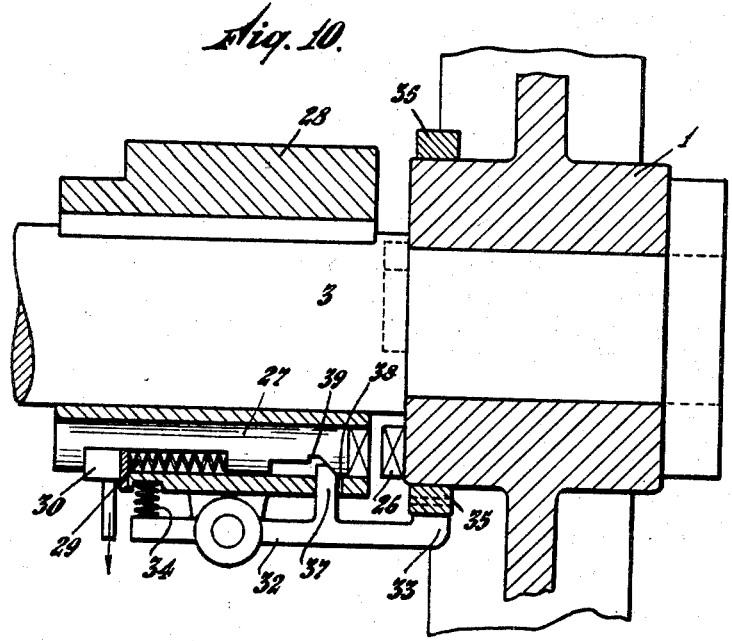
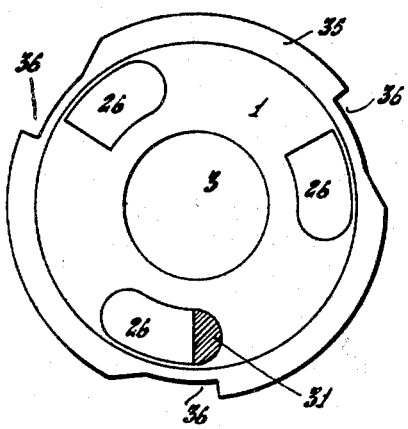
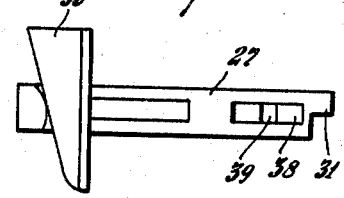

Patented Aug. 1, 1950

2,517,473

UNITED STATES PATENT OFFICE 2,517,473

CATCH-COUPLING FOR COUPLING AN AXLE TO A WHEEL ROTATABLE ROUND THAT AXLE

Jan Daniel Filarski, Amsterdam, Netherlands, assignor of one-half to Emil Gibas, Amsterdam, Netherlands Application August 23, 1946, Serial No. 692,642
In the Netherlands August 20, 1942

Section 1, Public Law 690, August 8, 1946
Patent expires August 20, 1962

1 Claim. (Cl. 192—29)

The invention relates to a catch-coupling for coupling an axle to a wheel rotatable thereon in different positions by means of a single adjustable coupling key which, when a detention pin is removed, is urged by a spring to take up the coupling position.

Such couplings are known as turning key couplings, although naturally instead of being rotatable, it is also possible to make the coupling key displaceable in the longitudinal direction of the axle.

With such couplings a bolt lever is coupled to a detention pin by a detention pin adjusting mechanism. The result of this is that the movement of this mechanism may be hampered and the operator will then be compelled to maintain pressure on the pedal until coupling is made. This hampers the operation considerably.

Also such couplings have a highly complicated bolting mechanism for the coupling key and it is also necessary to give great attention to the handling of the operating device for the stop-pin adjusting mechanism.

It is an object of the present invention to provide a greatly simplified coupling of this kind wherein the detention pin adjusting mechanism can be operated at any moment. To effect this, in accordance with the invention, the coupling key or pin has been provided with a cam having a notch adapted to receive a hook-shaped end of a bolt lever rotatably attached to the axle so as to prevent the key from shifting until the position of the driven and driving members are favorable.

A further object of the invention is to provide a structure wherein the bolt lever is entirely independent of the detention pin adjusting mechanism. As a result the operator, pressing down the pedal or handle, can at any moment remove the detention pin without being hampered by the lever or the operating member coupled to it.

It is possible to apply the invention both to rotatable and axially displaceable coupling keys, as will appear from the description following hereinafter.

The invention will now be more particularly described with reference to the drawing, representing a few of its embodiments.

Fig. 1 is a longitudinal section of a wheel with an axle of the usual construction to be coupled by means of a turning-key.

Fig. 2 is a section taken on the line II—II in Fig. 1.

Fig. 3 is an end view of this construction.

Fig. 4 is an end view of the axle and the wheel of a turning-key coupling according to the invention.

Fig. 5 is a horizontal section of the latter.

Fig. 10 is a longitudinal section of a sliding-key coupling according to the invention.

Figs. 11 and 12 are details of the same.

Figure 6:
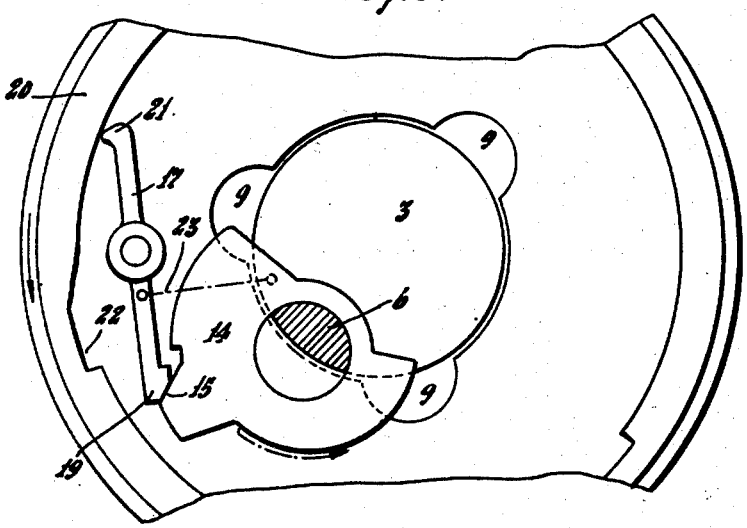
Figs. 6–9 show different positions of the axle, the wheel and the bolting device with respect to each other; the parts being shown more or less diagrammatically.

According to the known constructions shown in Figs. 1, 2 and 3 the driven wheel, with a sleeve 2 arranged in the hub thereof, is freely rotatable on the ring 4 and the end piece 5 of the axle 3. The ring 4 and end piece 5 are fixed to the axle 3.

A coupling-key 6 having the cylindrical portions 7 and 8 is rotatable in the ring 4 and the end piece 5. The middle part of this coupling-key is of approximately semi-cylindrical shape as shown in Fig. 2. In uncoupled position the key is held in the position shown in Fig. 2 by a stop-pin 13, against which rests a cam 12 attached to the key 6. If the stop-pin 13 is placed beyond the reach of the cam 12, the key can be rotated into the coupling position under the action of a spring 11, which at one end is attached to the end piece 5 and at its other end to an end piece 10 mounted on the coupling key 6, beyond the end piece 5. By this rotation, the coupling-key 6 may be introduced into one of the semi-circular grooves 9 in the sleeve of the wheel hub whereby axle and wheel are coupled.

To prevent the rotation of the coupling-key 6 from taking place at an unfavorable juncture, the turning-key 6, in the embodiment as shown in Figs. 4–9, beyond the end piece 5 and in addition to the end piece 10, is provided with a second end piece 14 having a cam surface 15 and a notch 16. The end pieces 10 and 14 may be formed as a single entity.

A double-armed bolt lever 17 rotatable about a pin 18, secured in the end piece 5, cooperates with the end-piece 14.

The end 19 of one lever arm is hook-shaped and cooperates with the cam 15 as well as with the notch 16. The end 21 of the other lever arm cooperates with the inner-side of a ring 20, attached to the hub of the wheel 1. This ring, on its inner side, is provided with openings 22, corresponding in number with the number of grooves 9 in the wheel hub for the coupling-key. The bolt lever 17 is further provided with a spring 23, which maintains contact between the ends of the lever and the ring 20 and the end piece 14.

Fig. 4 shows the uncoupled position of wheel and axle with the stop-pin 13 engaging the key 6. The key 6 consequently lies entirely within the axle 3, the cam 15 preventing the lever 17 from turning, so that the end 21 of the lever is held out of contact with the inner side of the ring 20.

If, in the position of the openings as shown in Fig. 4, the stop-pin 13 should be removed and consequently the coupling released, the end piece 14 by the action of spring 11 will start rotating counter-clockwise releasing lever 17. The opening 22 allows the lever 17 to start rotating and the hook-shaped end 19 will immediately engage the notch 16 and prevent the key 6 from rotating a further distance than that allowed by the clearance between the axle 3 and the sleeve 2. Consequently no coupling is brought about and with respect to the axle the wheel continues to rotate in the direction of the arrow 24.

After a small angle of rotation, however, which is sufficient to rotate the groove 9 under and past the key 6, the bolt lever 17 is turned clockwise by the beveled edge 25 of the opening 22 and the hook 19 is consequently lifted out of the notch 16. When, on being further rotated, the groove 9a comes opposite the key, there being no longer any obstacle, the key will turn into this groove and bring about coupling.

Figures 6, 7, 8 and 9 show a few positions of the various parts with respect to one another.

As regards the end piece 14 and the lever 17, Fig. 6 corresponds with Fig. 4. Here the coupling-key is not released, nor is the bolt lever in contact with the inner side of the ring 20. The position of the grooves 9, however, is different, as in the position of the openings 22. If at the moment shown in Fig. 6 the coupling-key 6 is released, the lever 17 cannot lock the end piece 14 and coupling will take place in the next following groove 9 in the direction of rotation.

If the parts were in the position as shown in Fig. 4 and the moment for releasing the key was consequently unfavorable, that moment is favorable with the parts in the position of Fig. 6.

Figure 7:
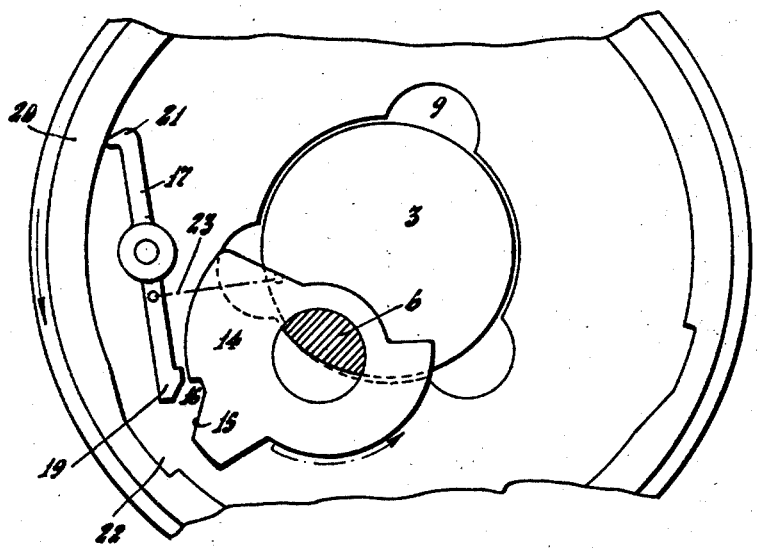

Fig. 7 represents a position immediately following the one of Fig. 6 after the release of the coupling-key. The free end 21 of the bolt lever 17 rests on the inner side of the ring 20.

Figure 8:
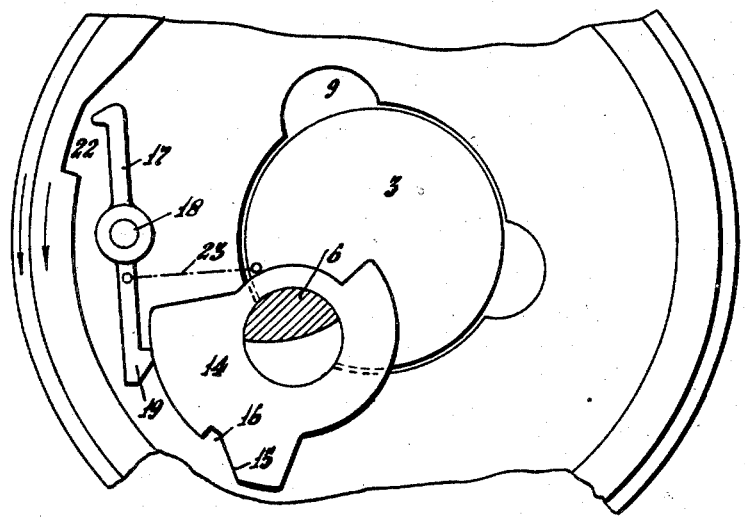

Fig. 8 shows a position with the wheel and the axle coupled together. The end 19 of the bolt lever 17 rests against the curvature of the end piece 14.

Figure 9:
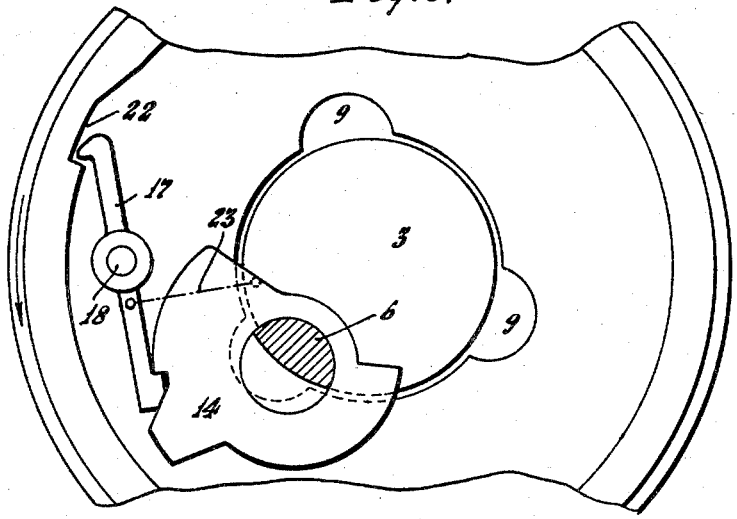

Fig. 9 denotes a position slightly in advance of that of Fig. 4. The coupling-key 6 has been released at an unfavorable moment. The entry of the key into a groove 9 is prevented by the bolt lever 17.

The above describes an embodiment with a rotatable coupling-key.

Figures 10, 11 and 12 show diagrammatically an embodiment with an axially displaceable key.

In these figures the wheel 1 is freely rotatable round the axle 3, with which it is to be coupled. The wheel hub is provided with lateral cams 26, adapted to co-operate with a coupling-key 27, which is axially displaceable in a sleeve 28 fixed to the axle. The displacement is possible due to the action of a spring 29, as soon as a wedge-shaped pawl 30 is pulled away by a treadle or some other mechanism, not shown. In the coupling position the end 31 of the key engages behind one of the cams 26 on the wheel hub.

Upon releasing the treadle, the pawl 30 will be returned to its original position and decoupling will take place.

This embodiment is also provided with a bolting device, the action of which corresponds with the one described above. The bolt lever is denoted by 32. Its end 33, by the spring 34, is kept in contact with a ring 35 on the wheel hub, in which the openings 36 have been arranged, which, at moments unfavorable for coupling, will lock the key 27. For this purpose the lever 32 has been provided with a cam 37, adapted to cooperate with a cam 38 and a notch 39 in the key.

In both the embodiments the stop-pin can be operated at any given moment and the operating mechanism be released immediately thereafter. The arrangements are such that with the simplest possible means the coupling key, in case of unfavorable mutual positions of key and groove, is prevented from shifting its position in accordance with the coupling position.

As in the case with the embodiments described above, the additional advantage may be gained that the bolt lever, with the coupling in an uncoupled position, is kept out of contact with the elevations or depressions of the wheel hub, by which wear and tear is prevented.

I claim:

In a clutch the combination of a driven element, a driving element revolvable relative to said driven element, a coupling key carried by said driven element, a series of coupling means carried by said driving element, spring means for displacing said coupling key into cooperation with one of the series of coupling means of the driving element, a lever rotatably supported by said driven element, a projection on said lever, a cam on said coupling key, a spring coacting with said lever to maintain said projection in engagement with said cam, said cam having a notch therein for receiving said projection to lock said coupling key and a guideway in the driving element whereby said lever may be operated to lock said coupling key by said projection when the relative position of the driving and driven elements is unfavorable for coupling said elements by said coupling key.

JAN DANIEL FILARSKI.

REFERENCES CITED

The following references are of record in the file of this patent:

UNITED STATES PATENTS

| Number | Name | Date |
| --- | --- | --- |
| 677,327 | Reed | June 25, 1901 |
| 1,026,437 | Gustafson | May 14, 1912 |
| 1,878,523 | Johnson | Sept. 20, 1932 |
| 1,903,049 | John | Mar. 28, 1933 |
| 2,003,529 | Dreis | June 4, 1935 |
| 2,045,483 | Mueller | June 23, 1936 |
| 2,232,584 | Aitken | Feb. 18, 1941 |

FOREIGN PATENTS

| Number | Country | Date |
| --- | --- | --- |
| 427,603 | Great Britain | Apr. 26, 1935 |